T. D. RICKS.
HOG YOKE.
APPLICATION FILED OCT. 16, 1919.

1,347,352.

Patented July 20, 1920.

Inventor
T. D. Ricks.

By Geo. P. Kimmel.
Attorney

UNITED STATES PATENT OFFICE.

TILLMAN D. RICKS, OF LYONS, GEORGIA.

HOG-YOKE.

1,347,352.

Specification of Letters Patent. Patented July 20, 1920.

Application filed October 16, 1919. Serial No. 331,142.

*To all whom it may concern:*

Be it known that I, TILLMAN D. RICKS, a citizen of the United States, residing at Lyons, in the county of Toombs and State of Georgia, have invented certain new and useful Improvements in Hog-Yokes, of which the following is a specification.

This invention relates to animal yokes and more particularly to yokes having outstanding arms for preventing animals from passing through or beneath fences.

The primary object of my invention is to provide a yoke for hogs or other animals formed of two identical sections in order that it may be quickly secured upon the neck of an animal and easily and quickly manufactured at very small initial cost.

Other objects of this invention not at this time more particularly enumerated will be clearly understood from a detailed description and drawings forming a part of this specification.

Furthermore this invention consists in the novel arrangement and combination of parts more particularly described in the following specification and embodied in the claims hereunto appended and forming a part of this application.

Referring to the drawing.

Figure 1:
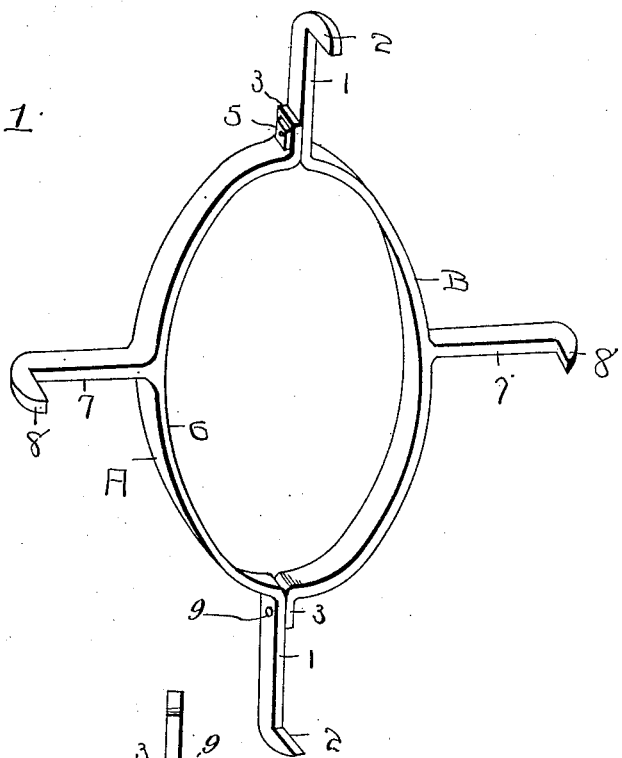
Figure 1 is a perspective view.
Figure 2:
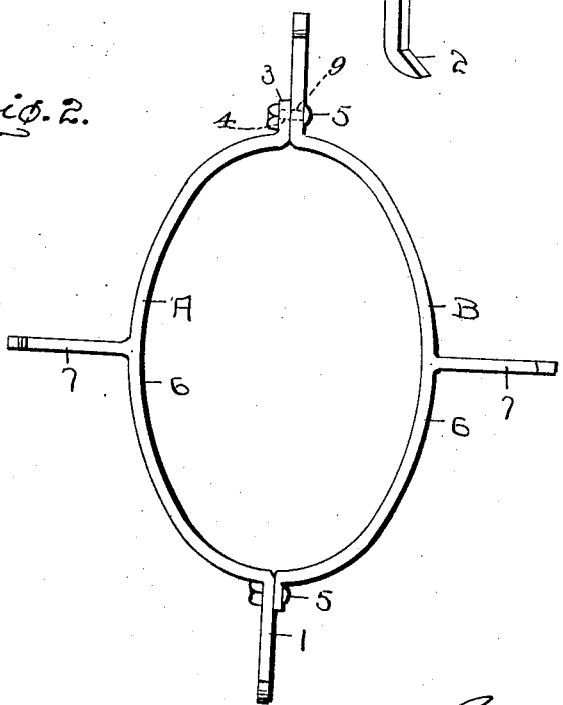
Fig. 2 is a plan view.

Referring to the drawing wherein like characters of reference indicate like or similar parts throughout the several views, the letters A and B indicate the two identical sections which when secured together form my invention, and as a detailed description of one will be readable upon the other I will for the sake of clarity confine myself to the parts as embodied in the section A and then show the relationship and the manner of securing the two sections together.

As shown, the section A is formed with an elongated arm 1 terminating in a slight hook 2, and a short foot 3 in line with the arm 1 and provided with an opening 4 for receiving suitable securing means, such as a bolt 5, for holding the sections together. Formed intermediate the arm 1 and the foot 3 is a substantially semi-elliptical bend 6 midway the extremities of which is a second elongated arm 7 substantially at right-angles to the arm 1 and having also formed thereon at its free end a hook 8. The arm 1 is also provided with an opening 9 adjacent the bend 6, the purpose of which will be hereinafter described.

Although the sections A and B are identical in construction they are reversed when secured together—that is, the foot 3 of the section A is placed upon the arm 1 of the section B, and likewise the foot 3 of the section B is placed upon the arm 1 of section A, so that the respective openings 4 and 9 register to receive the securing bolts 5 to hold the sections together.

In operation the sections are placed together in the manner outlined upon the neck of a hog or other animal and secured by the bolts or other fastening means 5, whereupon the arms 1 and 7 will extend outwardly to prevent the animal from passing under or through a fence, it being understood that the slight hooks 2 and 8, which are disposed to be operable on forward movement of the animal, will also coöperate with the arms for engaging the rails of the fence.

While I have shown and described the preferred embodiment of my invention it will be understood that minor changes in construction, combination and arrangement of parts may be made without departing from the spirit and scope of the invention as claimed.

What I claim as new and desire to secure by Letters Patent is:

An animal yoke comprising a pair of sections identical to each other, and adapted to be reversed when connected together, each section formed with a bowed portion, a foot at one end of the bowed portion, an arm at the other end of the bowed portion, and in alinement with said foot, a second arm projecting laterally from the bowed portion medially thereof, hook ends on said arms, the foot and first-named arm being flat, whereby when the two sections are reversed relative to each other, the foot on each section will rest against the arm adjacent thereto of the other section, and removable fasteners passed transversely through the feet and arms adjacent thereto of both sections for detachably securing said sections together.

In testimony whereof I affix my signature hereto.

TILLMAN D. RICKS.